(12) United States Patent
Lohneis

(10) Patent No.: US 11,916,877 B2
(45) Date of Patent: Feb. 27, 2024

(54) SYSTEM AND METHOD FOR THE PROTECTED TRANSMISSION OF DATA

(71) Applicant: SIEMENS MOBILITY GMBH, Munich (DE)

(72) Inventor: Georg Lohneis, Ebensfeld (DE)

(73) Assignee: Siemens Mobility GmbH, Munich (DE)

( * ) Notice: Subject to any disclaimer, the term of this patent is extended or adjusted under 35 U.S.C. 154(b) by 958 days.

(21) Appl. No.: 16/764,503

(22) PCT Filed: Nov. 7, 2018

(86) PCT No.: PCT/EP2018/080430
§ 371 (c)(1),
(2) Date: Sep. 25, 2020

(87) PCT Pub. No.: WO2019/096643
PCT Pub. Date: May 23, 2019

(65) Prior Publication Data
US 2021/0014199 A1    Jan. 14, 2021

(30) Foreign Application Priority Data
Nov. 15, 2017    (DE) ...................... 10 2017 220 370.6

(51) Int. Cl.
*H04L 29/06*    (2006.01)
*H04L 9/40*    (2022.01)
(Continued)

(52) U.S. Cl.
CPC ...... *H04L 63/0245* (2013.01); *B61L 15/0027* (2013.01); *B61L 15/0036* (2013.01);
(Continued)

(58) Field of Classification Search
CPC ...... H04L 63/0245; H04L 67/12; H04W 4/48; H04W 12/088; B61L 15/0027; B61L 15/0036; G05D 1/0022
See application file for complete search history.

(56) References Cited

U.S. PATENT DOCUMENTS 9,471,770 B2    10/2016    Beyer et al.
10,666,615 B2    5/2020    Grau
(Continued)

FOREIGN PATENT DOCUMENTS

DE    102011076350 A1    11/2012
DE    102014212484 A1    12/2015
(Continued)

*Primary Examiner* — Tri M Tran
(74) *Attorney, Agent, or Firm* — Laurence A. Greenberg; Werner H. Stemer; Ralph E. Locher

(57) ABSTRACT

A system for transmitting and receiving data, in particular for a rail vehicle, includes at least one in-vehicle control unit for processing and generating data, at least one external server unit with a communication device for establishing a communication connection with at least one in-vehicle interface, and at least one in-vehicle interface for transmitting data generated by the at least one in-vehicle control unit and for receiving data transmitted by the at least one external server unit. The at least one in-vehicle control unit and the at least one in-vehicle interface are interconnected so as to transmit data through an electronic filter device.

15 Claims, 1 Drawing Sheet

(51) Int. Cl.
*H04W 4/48* (2018.01)
*H04W 12/088* (2021.01)
*B61L 15/00* (2006.01)
*G05D 1/00* (2006.01)
*H04L 67/12* (2022.01)

(52) U.S. Cl.
CPC ........... *G05D 1/0022* (2013.01); *H04L 67/12* (2013.01); *H04W 4/48* (2018.02); *H04W 12/088* (2021.01)

(56) References Cited

U.S. PATENT DOCUMENTS

| | | |
|---|---|---|
| 10,940,812 B2 | 3/2021 | Gupta et al. |
| 2013/0151111 A1 | 6/2013 | Skelton |
| 2017/0093866 A1* | 3/2017 | Ben-Noon ............. H04L 67/12 |
| 2017/0134342 A1 | 5/2017 | Beyer et al. |
| 2017/0310674 A1 | 10/2017 | Markham |
| 2019/0337526 A1* | 11/2019 | Rave .................... G06F 21/554 |

FOREIGN PATENT DOCUMENTS

| | | |
|---|---|---|
| WO | 2017024078 A1 | 2/2017 |
| WO | WO 2017024076 A1 | 2/2017 |
| WO | 2017077857 A1 | 5/2017 |

* cited by examiner

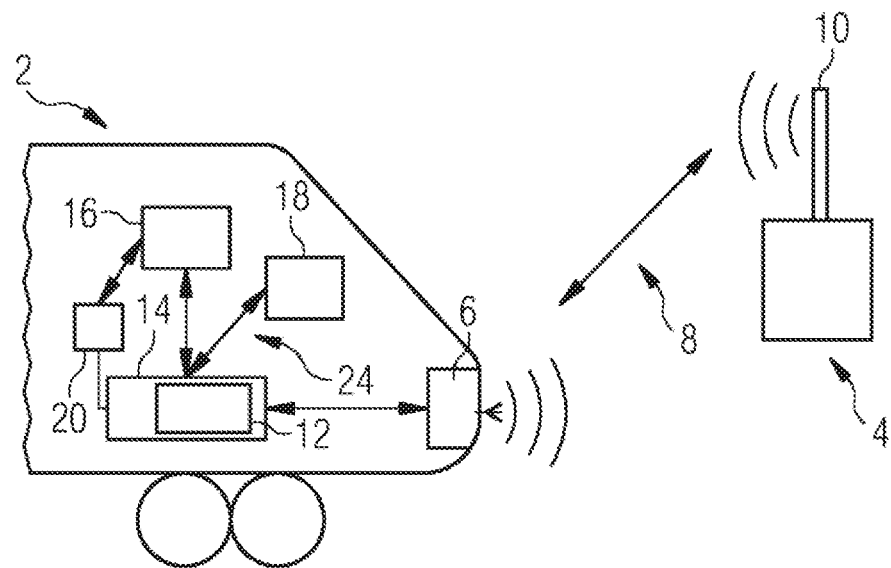
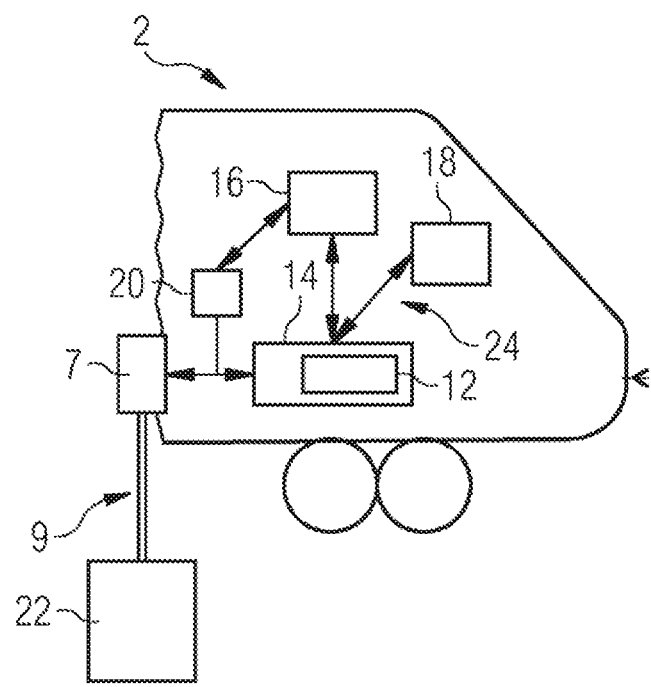

SYSTEM AND METHOD FOR THE PROTECTED TRANSMISSION OF DATA

BACKGROUND OF THE INVENTION

Field of the Invention

The invention relates to a system for transmitting and receiving data, in particular for a rail vehicle, and a method for transmitting data.

In order to prevent direct access to a control level or subsystems of rail vehicles, for example via the Internet by means of a radio unit or wired connections to the rail vehicle, protection must exist in the data traffic between the communication devices of the rail vehicle and the subsystems or the control level of the rail vehicle.

Conventional mechanisms for protecting communication connections are, for example, VPN tunnels and the use of firewalls.

An example of a firewall-based protection method is known from the document WO 2017/024078.

Methods for intrusion detection are furthermore known which can be used to protect communication connections of the rail vehicle.

However, hitherto known software-based methods inadequately protect communication connections against third-party access.

The software-based protection mechanisms can furthermore be manipulated by third parties, which can have disadvantageous repercussions on the operation of the rail vehicle. In the case of software-based protection of communication connections, a risk always exists that modifications can be made to the software and the protective mechanisms of the rail vehicle can be bypassed.

SUMMARY OF THE INVENTION

The object of the invention is to propose a system and a method for manipulation-proof protection of a control level of a rail vehicle against third-party access.

The object is achieved by the subject-matter described below. Advantageous designs of the invention form the subject-matter of respective dependent subclaims.

According to one aspect of the invention, a system is provided for transmitting and receiving data, in particular for a rail vehicle. The system has at least one in-vehicle control unit for processing and generating data.

At least one external server unit of the system has a communication device for establishing a communication connection to at least one in-vehicle interface.

The system further has at least one in-vehicle interface for transmitting data generated by the at least one in-vehicle control unit and for receiving data sent by the at least one external server unit.

According to the invention, the at least one in-vehicle control unit and the at least one in-vehicle interface are interconnected, having a data transmission capability, via an electronic filter device.

As a result, the communication connection between the at least one in-vehicle interface and the at least one control unit can be decoupled by a hardware filter. The filter or the electronic filter device is designed on a hardware basis and can check and protect the data traffic between the in-vehicle interface and the at least one in-vehicle control system. It can thus be ensured that only permitted messages or data are forwarded to the at least one control system.

The at least one in-vehicle interface, the at least one in-vehicle control device and the electrical filter device can be disposed in a rail vehicle as part of its electrical components. Here, at least one rail vehicle can be a component of the system according to the invention.

A technically simple protection of the control systems of a rail vehicle can be guaranteed by means of this solution. In particular, a manipulation-proof protection against unauthorized access to control systems of the rail vehicle can be implemented by means of the electronic filter device.

According to one example embodiment of the system, data transmitted between the at least one external server unit and the at least one in-vehicle control unit are verifiable by means of the electronic filter device. The electronic filter device is preferably a device consisting of discrete electronic components, electively in combination with integrated circuits, with at least one function for checking a data stream.

The data stream or the data can be configured in the form of data packets or in the form of data messages. It can be ensured by means of the at least one filter function that only data or data messages which do not impact on an operational functionality of the at least one in-vehicle control unit are transmitted via physical interfaces of this type, such as, for example Ethernet, RS232 and the like.

According to a further example embodiment of the system, data transmitted between the at least one external server unit and the at least one in-vehicle control unit are verifiable in terms of the validity and/or permissibility of the data by means of the electronic filter device. The data can preferably be transmitted in the form of protocols or data packets. A syntax and/or the semantics of the protocols can be verified in order to check the validity and/or permissibility of the transmitted data packets. Depending on the result of the check, the data can then be forwarded unhindered or can be blocked.

The electronic filter device can preferably operate and check the data bidirectionally. As a result, feedback messages generated by the at least one in-vehicle control unit in response to queries from an external server unit can also be securely transmitted.

The data or data packets blocked by the electronic filter device can be transmitted here back to the preceding component with an error message.

According to a further example embodiment of the system, the at least one in-vehicle interface is a communication device for establishing a wireless or wired communication connection to the at least one external server unit. The at least one interface may, for example, be a communication device for establishing a wireless communication connection.

The wireless communication connection can be based, for example, on a WLAN, UMTS, GSM, GPRS, LTE or similar transmission standard.

Alternatively or additionally, the at least one in-vehicle interface can be a wired interface for the provision of services, such as, for example, maintenance work, diagnostic work and the like. These functions can similarly be protected or checked by the electronic filter device. The hardware filter or the electronic filter device is disposed, having a data transmission capability, between an interface designed as a service access and at least one in-vehicle control unit.

According to a further example embodiment of the system, the at least one external server unit is a control center outside the vehicle or a control device outside the vehicle. The at least one external server unit can thus be a computer system of a control center or of a railroad station which can communicate, having a data transmission capability, with a rail vehicle via a wireless communication connection. For this purpose, the computer system has communication devices to perform a wireless data transmission.

Alternatively or additionally, the at least one external server unit can be a control device or a portable computer which can be coupled via a wireless or wired connection to the at least one in-vehicle interface. As a result, maintenance and diagnostic work can be carried out on the rail vehicle by maintenance personnel, wherein interfaces of this type are similarly protected by the electronic filter device. The service interfaces can therefore also be protected by the electronic filter device in the event of unauthorized access.

According to a further example embodiment of the system, the electronic filter device is deactivatable or activatable via a switch. The electronic filter device can be disabled via a hardware switch in order to guarantee unrestricted data traffic, for example between a radio system and a control unit. This may be necessary, for example, in order to be able to access the control unit during a commissioning of the control unit.

According to a further example embodiment of the system, the electronic filter device is deactivatable or activatable by the at least one in-vehicle control unit. The electronic filter device can thereby be controllable by at least one in-vehicle control unit. In particular, the switch can be actuatable directly by the at least one in-vehicle control unit in order to activate or deactivate the electronic filter device.

Alternatively or additionally, the at least one in-vehicle control unit can be connected directly to the electronic filter device so that the functional capability of the electronic filter device can be influenced directly by the at least one in-vehicle control unit.

The at least one control unit can thus directly or indirectly activate or deactivate the electronic filter device.

According to a further example embodiment of the system, the electronic filter device is activatable by the at least one in-vehicle control unit depending on an operating mode and/or a speed of the rail vehicle. The switch can be connected to the control system or at least to an in-vehicle control unit so that the filter function of the electronic filter device is not accidentally left deactivated during the operation of the rail vehicle. If certain conditions prevail, such as, for example, if the maintenance mode of the rail vehicle is deactivated or if the rail vehicle has a speed higher than e.g. 5 km/h, the filter function of the electronic filter device is forcibly reactivated. The correct function of the electronic filter device can thereby be guaranteed.

According to a further example embodiment of the system, the electronic filter device is automatically activatable by the at least one in-vehicle control unit. The hardware filter can be forcibly reactivated by the at least one control unit through the automatic activation of the electronic filter device despite an error on the part of maintenance personnel or a forgotten manual activation of the hardware filter.

According to a further example embodiment of the system, the electronic filter device is connected, having a data transmission capability, directly or via a network to the at least one in-vehicle control unit. The at least one in-vehicle control unit can be connected directly to the hardware filter or to the electronic filter device. In particular, the electronic filter device can be integrated into the at least one in-vehicle control unit or can be connected via a data cable to the at least one control unit. Alternatively or additionally, the electronic filter device can be coupled via a network to the at least one in-vehicle control unit. The network can preferably be an Ethernet network, a vehicle network or a vehicle bus of the rail vehicle. The entire network or a communication with a plurality of components can thus be secured by the electronic filter device.

The filter unit or filter device can preferably be designed as dedicated hardware or as a control device or can be integrated into existing hardware, such as, for example, a control unit.

According to a further example embodiment of the system, the at least one in-vehicle interface is a wireless communication device or a service interface. As a result, the at least one in-vehicle control unit can be of flexible design and can offer a multiplicity of different coupling options.

According to a further aspect of the invention, a method is provided for transmitting data with a system according to the invention.

In one step, a wireless or wired communication connection is established between the at least one in-vehicle interface and at least one external server unit.

Data can be transmitted unidirectionally or bidirectionally via the established communication connection. The data can be transmitted in the form of packets or messages. The data transmitted to the at least one in-vehicle interface are verified by an electronic filter device.

The permissible and/or valid data verified by the electronic filter device are forwarded unchanged by the electronic filter device to at least one in-vehicle control unit.

The impermissible and/or invalid data verified by the electronic filter device are blocked by the electronic filter device or are transmitted back to the at least one in-vehicle interface.

With this method, it can be ensured that only those data or data packets which do not impact on the operation of the vehicle can be transmitted to at least one control unit of a rail vehicle or vehicle. The data which have an impact on an operation of the vehicle can be filtered or blocked in advance by the electronic filter device.

Corresponding control devices having a filter function according to the invention can furthermore be more easily authorized, since the necessary supporting evidence can be provided in a technically simple manner. This can be achieved by checking the filter function and the absence of a disadvantageous impact on an operation of the vehicle by the filter function.

A technically simple protection of the control systems of a vehicle can be guaranteed by the method according to the invention. In particular, a manipulation-proof protection against unauthorized access to the control systems of the rail vehicle can be implemented by the electronic filter device.

According to one example embodiment of the method, the electronic filter device is activated or deactivated via a switch or the at least one in-vehicle control unit. The electronic filter device can thereby be controllable via a mechanical or electronic switch. In particular, the hardware filter can be bypassable by means of the switch. Alternatively or additionally, the electronic filter device can be activatable or deactivatable by at least one in-vehicle control unit. The filter function can thus be disabled, thereby enabling unrestricted access to all control devices in the vehicle.

According to a further example embodiment of the method, the electronic filter device is disposed in a rail vehicle and is automatically activated in a deactivated state depending on time, speed and/or an operating mode of the rail vehicle. A forcible activation of the electronic filter device which corrects an accidental deactivation of the filter function can thus be implemented.

The characteristics, features and advantages of this invention described above and the manner in which these are achieved will become clearer and more readily understandable from the explanation of the following, highly simplified, schematic representations of preferred example embodiments.

BRIEF DESCRIPTION OF THE SEVERAL VIEWS OF THE DRAWING

FIG. 1 shows a schematic representation of a system according to a first example embodiment according to the invention, and FIG. 2 shows a schematic representation of a system according to a second example embodiment of the invention.

The same structural elements in each case have the same reference numbers in the figures.

DETAILED DESCRIPTION OF THE INVENTION

FIG. 1 shows a schematic representation of a system 1 according to a first example embodiment according to the invention. Here, the system 1 has a rail vehicle 2 and an external server unit 4. The external server unit 4 is, for example, a control center or operational center for monitoring and controlling rail traffic.

The rail vehicle 2 has a communication device 6 which can establish a wireless communication connection 8 to a communication device 10 of the external server unit 4 for bidirectional transmission of data or data packets. The communication connection 8 is configured here as a mobile radio connection, for example via a UMTS or LTE network.

The data transmitted by the external server unit 4 can be received by the communication device 6 of the rail vehicle 2. According to the example embodiment, the communication device 6 of the rail vehicle 2 is an in-vehicle interface 6.

The data are then forwarded by the communication device 6 to an electronic filter device 12. The electronic filter device is designed as integrated into a separate control device 14 of the rail vehicle 2.

The permissible data are forwarded by the filter device 12 to at least one in-vehicle control unit 16, 18.

Here, the rail vehicle 2 has, by way of example, two in-vehicle control units 16, 18. The control units 16, 18 can receive and process the transmitted data. The in-vehicle control units 16, 18 are configured as two independent control devices for processing or calculating data. The two control units 16, 18 are coupled via a network 24 to the filter device 12 for data communication purposes.

A switch 20 is disposed in the rail vehicle 2 to deactivate and activate the filter device 12. The control device 14 can be thereby bypassed. An in-vehicle control device 16 is similarly coupled to and can automatically actuate the switch 20. The electronic filter device 12 can thus be automatically activated, provided that the rail vehicle 2 is moved at a defined speed.

FIG. 2 shows a schematic representation of a system 1 according to a second example embodiment according to the invention. In contrast to the first example embodiment, the rail vehicle 2 has a second in-vehicle interface 7 which is designed as a service interface 7.

A diagnostic device 22, for example, can be coupled via a wired communication connection 9 to the service interface 7 for maintenance work purposes. The diagnostic device 22 may, for example, be a tablet or notebook which is connectable via a cable 9 to the in-vehicle interface 7.

Direct access to the control units 16, 18 can thereby be implemented, wherein the data transmitted via the communication connection 9 are checked by the electronic filter device 12.

The invention claimed is:

1. A system for transmitting and receiving data for a vehicle or rail vehicle, the system comprising:
   at least one in-vehicle controller for processing and generating data;
   at least one in-vehicle interface for transmitting data generated by said at least one in-vehicle controller;
   at least one external server with a communication device for establishing a communication connection to said at least one in-vehicle interface and for transmitting data to said at least one in-vehicle interface;
   an electronic filter interconnecting said at least one in-vehicle controller and said at least one in-vehicle interface for transmitting data;
   said electronic filter being configured as hardware decoupling a communication connection between said at least one in-vehicle interface and said at least one in-vehicle controller as a hardware filter only forwarding permitted data to said at least one in-vehicle controller; and
   said electronic filter configured to be activated or deactivated by said at least one in-vehicle controller;
   said electronic filter configured to be automatically activated when in a deactivated state depending on a time, a speed, and/or an operating mode of the rail vehicle.

2. The system according to claim 1, wherein said electronic filter is configured to verify data transmitted between said at least one external server unit and said at least one in-vehicle controller.

3. The system according to claim 1, wherein said electronic filter is configured to verify data transmitted between said at least one external server unit and said at least one in-vehicle controller in terms of at least one of validity or permissibility of the data.

4. The system according to claim 1, wherein said at least one in-vehicle interface is a communication device for establishing a wireless or wired communication connection to said at least one external server.

5. The system according to claim 1, wherein said at least one external server is a control center disposed outside the vehicle or a control device disposed outside the vehicle.

6. The system according to claim 1, wherein said electronic filter is activatable by said at least one in-vehicle controller depending on at least one of an operating mode or a speed of the rail vehicle.

7. The system according to claim 1, wherein said electronic filter is automatically activatable by said at least one in-vehicle controller.

8. The system according to claim 1, wherein said electronic filter is connected for data transmission directly or through a network to said at least one in-vehicle controller.

9. The system according to claim 1, wherein said at least one in-vehicle interface is a wireless communication device or a service interface.

10. The system according to claim 1, wherein said electronic filter is configured such that upon being activated by said at least one in-vehicle controller, said electronic filter determines whether to forward the data, which is transmitted by said at least one external server, to said at least one in-vehicle controller by checking the data transmitted by said at least one external server.

11. The system according to claim 1, wherein said electronic filter is activatable by said at least one in-vehicle controller depending on a speed of the rail vehicle.

12. The system according to claim 1, wherein when said electronic filter is activated, the permitted data that is forwarded is only data that does not impact on an operational functionality of the at least one in-vehicle controller.

13. The system according to claim 1, wherein said electronic filter is configured to be activated and deactivated by said at least one in-vehicle controller.

14. The system according to claim 1, wherein said electronic filter is configured to be activated by said at least one in-vehicle controller.

15. A method for transmitting data, the method comprising the following steps:

provinding a system for transmitting and receiving data according to claim 1;

establishing a wireless or wired communication connection between the at least one in-vehicle interface and the at least one external server;

automatically activating the electronic filter when the electronic filter is in a deactivated state depending on a time, a speed, and/or an operating mode of the rail vehicle;

using the electronic filter to verify data transmitted to the at least one in-vehicle interface;

forwarding at least one of permissible or valid data verified by the electronic filter unchanged to at least one in-vehicle controller; and blocking at least one of impermissible or invalid data checked by the electronic filter or transmitting the at least one of impermissible or invalid data checked by the electronic filter back to the at least one in-vehicle interface.

* * * * *